May 3, 1938. G. E. SEIL 2,116,218
DEFLECTION OF ELECTRODE ARCS
Filed Jan. 21, 1937
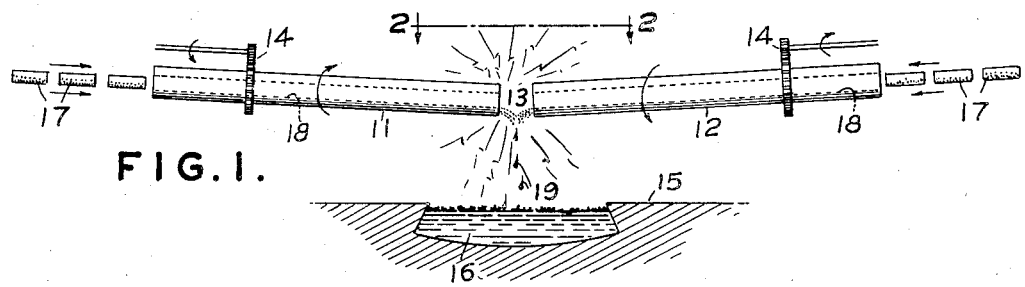
FIG. 1.
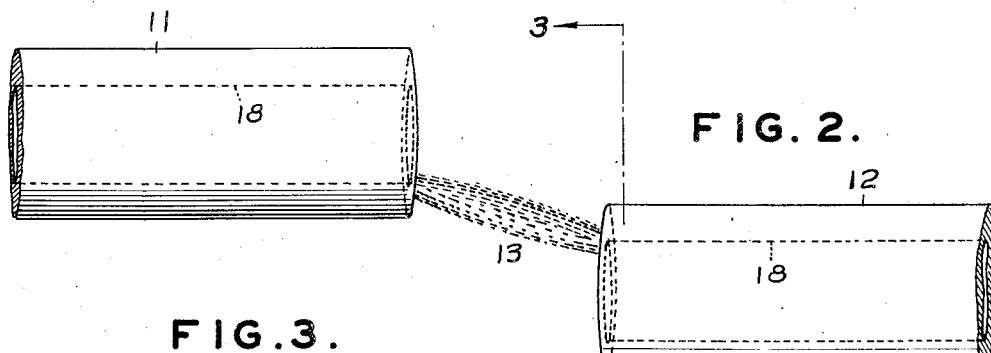
FIG. 2.
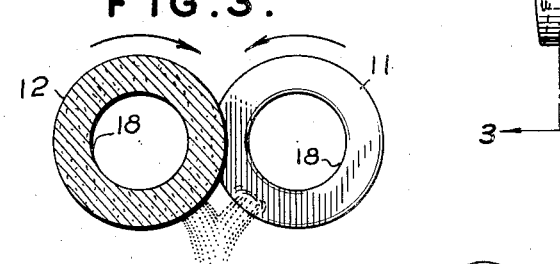
FIG. 3.
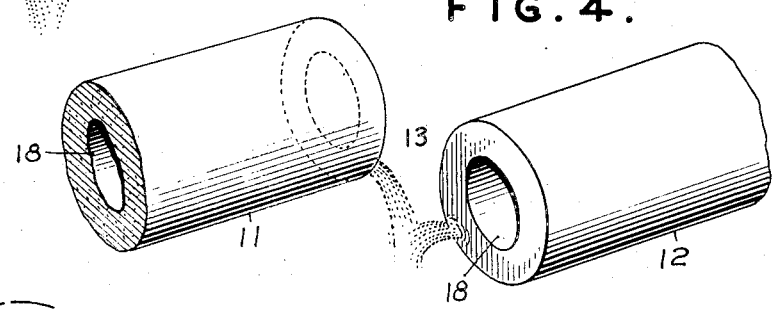
FIG. 4.
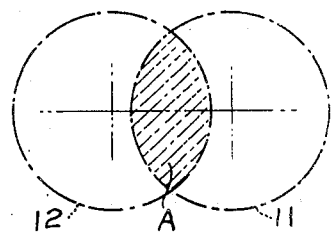
FIG. 5.
FIG. 6.
INVENTOR
GILBERT E. SEIL,
BY Arthur Middleton
ATTORNEY.

Patented May 3, 1938

2,116,218

UNITED STATES PATENT OFFICE 2,116,218

DEFLECTION OF ELECTRODE ARCS

Gilbert E. Seil, Cynwyd, Pa.

Application January 21, 1937, Serial No. 121,423

7 Claims. (Cl. 13—11)

This invention relates to the controlling or deflecting of an electric arc for the purpose of directing the energy of the arc toward a desired point or object.

In an electric furnace of the single phase indirect arc type it is usual practice to melt or refine a bath of metal by the heat generated when an electric arc is passed between the adjacent ends of a pair of horizontal electrodes. In a two electrode furnace these electrodes are usually so placed that their longitudinal axes are in alignment, and so that their adjacent ends will coincide when the electrodes are abutting. In a multiple electrode furnace, for example an elliptical or horizontal cylindrical furnace heated by three pairs of electrodes, it is usual practice to have the center pair of electrodes in alignment as described, with the outside pairs being in such angular relationship in a horizontal plane that when projected the longitudinal axes of each pair of electrodes will tend to meet in the lengthwise vertical center plane of the furnace.

Several variations of this practice are known. The electrodes are sometimes arranged at a slight angle above the horizontal, but otherwise maintained in the relationship described above. Other variations are found in the electrodes, which may be solid or hollow, or which may be stationary, oscillating, or rotating.

In the known arrangements of a pair of single phase horizontal electrodes, it is beyond the power of the operator to control the direction of the arc passing between the adjacent ends of the pair of electrodes, and it is also beyond the power of the operator to deflect the arc in a predetermined direction. The ability to control the direction of the arc, and to deflect the arc in a predetermined direction is the basis of this invention. By the use of this invention, it is possible to convert an indirect to a direct arc furnace.

If, in an electric furnace having the known electrode arrangement, the arc is deflected toward the roof, several undesirable conditions exist. A large portion of the heat of the arc will be transferred to the roof and sidewalls of the furnace, and radiated from them to the bath of metal, and there is a slow transfer of heat from the arc to the bath. Accordingly it is one object of this invention, as applied to electric furnaces, to effect a quicker heat transfer from the arc to the bath of metal, resulting in a considerable saving in the time required for melting and refining the charge, and allowing a larger output per unit of time by the furnace. Further, by having a direct transfer of heat from the arc to the bath, the severity of the treatment to which the refractories in these units is subjected is reduced, resulting in longer refractory life and lower refractory costs; so that it becomes a further object of this invention as applied to electric furnaces to increase the life and lower the cost of the refractories per unit of production used in the construction of the furnaces.

These and other advantages and objects of the invention will become apparent in the following description, in which one application of the invention, namely, its use in electric furnaces of the indirect arc type, is given in detail.

This invention is based upon my discovery that in an electric furnace of the indirect arc type, having horizontal or substantially horizontal electrodes, the direction of the arc between a pair of single phase rotating electrodes, or of the arcs between a plurality of pairs of rotating electrodes coacting as pairs of single phase rotating electrodes, can be controlled with certainty by off-setting the electrodes so that their respective longitudinal center lines, when projected, will not meet in the lengthwise vertical center plane of the furnace as has been the previous practice, but so that these projections will intersect the vertical horizontal center plane at a distance apart less than the radius of one of the electrodes. In this arrangement, the faces of the electrodes will not coincide, but will overlap, if the electrodes are made to meet in the lengthwise vertical center plane of the furnace. The amount of overlap, that is the area common to the projections of the two faces in the lengthwise vertical center plane of the furnace, controls the place on the electrode where the current density is greatest, and therefore, the spot on the electrode from which the arc will jump. Experience indicates that an overlap greater than 40% of the diameter of the electrode has very little effect, while the best results are obtained with a range of overlap lying between 25% and 40% of the electrode diameter. By arranging the direction of rotation of the electrodes so that the overlapping portions of both electrodes are moving in a downward direction, the arc is always deflected downward toward the bath.

An application of this invention in its simplest form would be in connection with a lighting arc with means for directing the arc toward a predetermined point.

Another application of this invention is found in electric furnaces wherein a bath of metal is to be exposed to the heat generated by an electric arc passing between the adjacent ends of a pair of electrodes, or by arcs passing between the adjacent ends of a plurality of pairs of electrodes.

Still another application is found in electric furnaces provided with hollow electrodes, through the bore of which materials can be fed to the furnace hearth, which furnaces are used advantageously in the smelting of metals and metal alloys. Representative thereof is a furnace disclosed in my patent application Serial No. 22,963, filed May 23, 1935. That furnace may be said to include a hearth provided for the metal to be treated, and a pair of substantially horizontal rotatable, hollow electrodes, with means for feeding through the bores thereof cores of starting materials for use in the heat and possibly chemical treatment of a bath of metal on the furnace hearth.

Since the heating of the metal on the hearth and the maintaining of the temperature thereof is an important practical aim in such a furnace, one object of this invention is to attain that aim by controlling the deflection of the arc so that it is directed downwardly toward the furnace hearth. Since it is desired to make use of this invention in connection with rotating electrodes, another object of the invention is to devise an arrangement whereby the direction of the deflection of the arc is determined by the relative direction of the rotation of the electrodes, the relative position of the electrodes, and the peripheral speed of the rotating electrodes.

Another object is to effect the automatic trimming of the arc ends of the electrodes for discouraging harmful erosion thereof or other misshaping. And a further object is to stabilize the arc to prevent it from jumping.

An advantage of the invention lies in the fact that the trimmed electrodes make for the maintenance of a constant arc between the electrodes, which fact is especially advantageous in uses other than furnaces where a constant arc and properly trimmed electrodes are desirable.

Another advantage in the invention lies in the fact that in furnaces of the type exemplified, there is a quicker heat transfer from the arc to the bath with a properly directed arc, effecting a considerable saving in the time required for melting and refining the charge. And a still further advantage in the invention lies in the fact that by its use the placement of the heat can be controlled. In small furnaces where the refractory linings tend to disintegrate quickly, this tendency can be discouraged by directing the major portion of the heat away from the refractory linings and toward the furnace burden to be heated.

With these, and possibly other objects and features of advantage, hereinafter referred to, the invention may be said to revolve about the realizing of the control of the direction of the arc supported between co-acting energized electrodes by making use of a particular relative disposition of the electrodes during the operation thereof. More detailed aspects of this relative relationship of the electrodes resides in the consideration of examples of the three possibilities.

(1) In its simplest form the invention consists of horizontal, offset rotating electrodes, the placement of which is such that the axes of the electrodes are aligned in elevation, but non-aligned in a plan view.

(2) The second arrangement consists of arranging the electrodes in (1) so that they are disposed at an angle to the horizontal position.

(3) The third arrangement consists of revolving the electrode arrangement as a unit in either (1) or (2) through any degree while maintaining these electrode units in the same angular relationship with a plane which the electrodes held with the horizontal plane in (1) and (2).

This invention is illustrated in the accompanying drawing showing more or less diagrammatically an embodiment of the invention selected as an informative exemplification of the features of the invention. In the drawing, Figure 1 is a diagrammatic elevational view indicating the furnace hearth and the electrodes, with the furnace top and the walls not shown;

Figure 2 is a plan view of the adjacent ends of the electrodes;

Figure 3 is the projection of the electrode ends on a plane equidistant from these ends, which plane bisects the angle made by two planes, each of which is defined by horizontal elements perpendicular to the axes of each electrode;

Figure 4 is a partial perspective view showing the offset relationship of the adjacent ends of a pair of electrodes; and Figures 5 and 6, are diagrammatic showings of overlapping areas of suppositious projections of a pair of electrodes.

In the drawing, the numeral 11 represents one electrode of a pair, and 12 the other. In this example, these electrodes are oppositely directed and disposed substantially horizontally or within a few degrees thereof. They are energizable in known manners, and between them, an arc 13 is supported or sustained. The electrodes are rotatable by any suitable driving mechanism, indicated generally by 14. 15 represents a furnace hearth, and 16 metal material thereon. 17 indicates cores of starting material adapted to be fed forcibly through bores 18 of the electrodes. As the cores 17 are passed through the electrodes, they encounter the heated zones thereof, as well as the arc itself, in consequence whereof the material of the cores receive the desired heat treatment. The material becomes molten and is emitted from the arc end of the electrodes, in the form of a stream or a stream of drops 19. It is also important to expose the metal material on the hearth to heat treatment to effect melting thereof as well as to maintain the consequent molten condition thereof, so it is desirable to deflect the arc downwardly toward the metal material on the furnace hearth, whereby there may be effected an efficient transfer of heat from the arc to the metal material.

A furnace of this type is shown and described more particularly in my patent application hereinbefore referred to, although it is believed that the invention hereof can be understood without reference to that specification. A furnace of this type can be used in carrying out a multiplicity of metallurgical processes. Among them is one disclosed in my copending patent application Serial No. 59,690, filed January 18, 1936 and patented February 9, 1937, as Patent No. 2,070,186 which described a method of refining ferro alloys by first melting metal material to be refined 16, into a bath on the furnace hearth 15, having thereon an oxidizing slag. The proportion of the constituents of that material are changed by decreasing the quantity of undesirable oxidizable ones (such as carbon) and increasing the desirable ones (such as chromium) all under thoroughly controlled conditions.

This charging is done by feeding to the bores 18 of the electrodes 11 and 12, cores 17 of reactable starting materials, which in passing through and under the influence of the heated zone of the electrodes, are transformed into a highly oxidizing refining reagent comprising metal substances desirable in the bath including a metal having uniformly dispersed therein a metal oxide. When drops of this reagent enter the bath on the furnace hearth, a refining reaction takes place in that the oxygen of the metal oxide gives up its oxygen content to the undesirable oxidizable impurity, with the result that the oxidized impurity migrates from the refined metal as an oxide. The metal thus reduced from the metal oxide constitutes increments thereof to the bath of metal material being refined. The refined metal is separated from the slag in a usual manner. Such a furnace also may be used advantageously in smelting, and possibly in other methods of metal treatment.

While these are suggested processes wherein this invention finds usefulness, it is to be understood that it will find applicability wherever in an electric furnace, an indirect arc between substantially horizontal rotating electrodes is made use of to heat a material on the furnace hearth, since the paramount feature of the invention is directed to the deflection of the arc in a desired direction. Indeed, the invention finds usefulness wherever it is desired to direct the arc of a pair of electrodes or the arcs of a plurality of pairs of electrodes in a desired direction.

Specifically, it is proposed herein to so place the units of a pair of rotating electrodes, or the units of a multiplicity of pairs of rotating electrodes, so that the axes of each pair are not in alignment, but are so arranged that the projections of their peripheries would intersect in a vertical plane equidistant from the faces of the electrodes, which plane is the bisector of the angle made by two planes defined by horizontal elements perpendicular to the axes of the electrodes. The electrodes are so rotated that the areas which in projection on the vertical plane described above are common to both electrode faces, are moving in the same relative direction, that is, the direction in which it is desired to deflect the arc. A clearer explanation is possible when viewing the electrodes from the far end (that is, the end outside the furnace) of one electrode of a pair. If, viewed from this position, the further electrode is to the right of the nearer electrode, the nearer electrode will rotate in a clockwise direction, and the further electrode will rotate in a counter-clockwise direction, and the suppositiously overlapping areas of the adjacent ends the electrodes will move in the same relative direction, namely, downward. If, on the other hand, the further electrode when viewed from this position is to the left of the nearer electrode, the direction of rotation of the electrodes will be reversed, but the result will be the same, that is, the suppositiously overlapping areas of the adjacent ends of the electrodes will move in the same relative direction, namely, downward. The arc will always be deflected at right angles to the line joining the center points of the projections of the intersecting electrode faces in the plane described above, and in a direction determined by the direction of the rotation of electrodes.

With the electrodes placed as thus described, their ends would overlap if they were to meet. This "apparent" overlap is observable in a view such as that shown in Figure 3. The local current density is a function of the extent of this overlap. Figures 5 and 6 show that the area in which the current density is controlled varies with the overlap. In ten inch diameter electrodes having a four inch overlap, A indicated in Fig. 5, the common chord in the circles is eight inches long, and the common area of the circles is 22.386 square inches. In the same electrodes with a two inch overlap, B indicated in Fig. 6, the common chord is six inches long and the common area is 8.168 square inches. In other words, all other factors remaining constant, the current density in the common area is increased as the distance of overlap is decreased, and practical advantage can be taken of this fact between the limits of an overlap amounting to 25% of the electrode diameter, at which there is obtained the best results, and 40% of the electrode diameter, beyond which no effect of the overlap is noted.

Inasmuch as it is proposed to use this invention in one of its manifestations wherein the arc is desired to be directed downwardly in connection with substantially horizontal electrodes that are rotated (whereby, among other reasons, the arc ends of the electrodes are automatically kept in trimmed condition for high efficiency), the electrodes would be so offset from each other that the adjacent portions of each would turn downwardly. The arc follows the hot spot on a rotating electrode, and since both electrodes are given a downward motion at their closest points, the arc of necessity always points downwardly toward and remains substantially fixed in relation to the bath on the furnace hearth, as shown in Figures 3 and 4. That is, by arranging rotating electrodes as above described, and rotating each in a direction so that the overlapping portions of both electrodes have a downward motion, by that motion the arc is always deflected downwardly toward the furnace hearth. However, in rotating electrodes so disposed, it has been found in the embodiment shown that the peripheral velocity of the electrodes has an effect upon results. I have had satisfactory results by using a peripheral speed of three inches per minute, that is, one revolution of a ten inch diameter electrode in ten and a half minutes, although peripheral speeds can be used lying in a range of from 2 to 6 inches per minute.

The ability to force the arc to play upon the bath on a furnace hearth is a decided advantage. The arc is the source of heat and when the arc plays on the bath, the best conditions for heat transfer to the bath are obtained. When the arc extends toward the roof of the furnace, the bath gets its heat largely by reflections from the roof. This is slow and inefficient, as well as hard on the refractory lining, since the refractories must be at a higher temperature than the bath. The ability to control the direction of the arc also stabilizes it against jumping.

In the embodiment shown herein, further advantage is realized due to the fact that with a properly directed arc in an electric furnace of the exemplified type, the stream of molten metal leaving the hollow electrodes follows the arc and is maintained at a very high temperature during its movement in the arc to a localized zone in the slag superheated by the directed arc. In this superheated zone the desired metallurgical reactions take place more rapidly than in other portions of the slag, as the superheated metal impinges upon and penetrates through the slag into the metal of the bath. By virtue of this, the conditions for reaction are materially improved. As used in this application, a rotating electrode is defined as one which revolves about its longitudinal center line as an axis.

The method of smelting metals disclosed herein has been claimed in my divisional application Serial No. 152,864, filed July 8, 1937.

I claim:—

1. In an electric furnace, a pair of energizable substantially horizontal electrodes adapted for sustaining an arc between their adjacent ends, said electrodes being disposed with their axes in non-alignment so that projections of the peripheries thereof will overlap, and means for rotating said electrodes about their axes so that the overlapping portions of the electrodes are given a common mean downward motion whereby an arc sustained between the adjacent ends of said electrodes is directed substantially in a downward direction.

2. An electric furnace according to claim 1 in which the range of said overlap lies between 25% and 40% of the electrode diameter.

3. Apparatus for controllably deflecting an electric arc comprising a pair of energizable oppositely directed electrodes having their axes lying in substantially parallel vertical planes and so positioned that projections of the arc sustaining ends thereof will overlap, and means for rotating said electrodes about their axes in a manner so that the overlapping areas move in the same direction whereby an electric arc sustained between the ends of the respective electrodes is directed substantially in the direction of those surfaces of the electrodes that are departing from each other.

4. Apparatus according to claim 3 in which the oppositely directed electrodes have their electrically conductive areas annular.

5. Apparatus for sustaining an electric arc comprising a pair of energizable, oppositely disposed, substantially horizontal cylindrical electrodes, said electrodes having their axes lying in substantially parallel vertical planes and so positioned that projections of the arc sustaining ends thereof will overlap, and means for rotating said electrodes about their axes so that the overlapping portions of the respective electrodes are given a common mean downward motion whereby an electric arc sustained between the ends of said electrodes is directed substantially in a downward direction.

6. The method of controlling the direction of an arc between electrodes which consists in effecting relative rotation between a pair of substantially oppositely directed electrodes arranged so that the axes of the same are in non-alignment and that projections of the adjacent ends of said electrodes are in overlapping relation with the direction of rotation being such that the overlapping areas move in the same direction.

7. The method according to claim 6 in which the electrodes are rotated so that rotation of the hot spots formed on the ends of the electrodes takes place in the same general direction as that of the overlapping areas of the electrodes.

GILBERT E. SEIL.